United States Patent [19]
Baker

[11] 3,783,764
[45] Jan. 8, 1974

[54] REFLEX CAMERA AND VIEWING DEVICE
[75] Inventor: James G. Baker, Winchester, Mass.
[73] Assignee: Polaroid Corporation, Cambridge, Mass.
[22] Filed: June 21, 1972
[21] Appl. No.: 264,933

Related U.S. Application Data
[63] Continuation of Ser. No. 98,356, Dec. 15, 1970, abandoned.

[52] U.S. Cl. .................................... 95/42, 88/1.5
[51] Int. Cl. ............................................ G03b 19/12
[58] Field of Search........................... 95/42; 88/1.5; 350/27, 52, 301

[56] References Cited
UNITED STATES PATENTS

| | | | |
|---|---|---|---|
| 1,307,512 | 6/1919 | Niell | 95/42 |
| 2,350,793 | 6/1944 | Mihalyi | 95/42 |
| 2,907,512 | 6/1959 | Grey | 95/42 |
| 2,980,001 | 4/1961 | Sauer | 95/42 |
| 3,464,338 | 9/1969 | Jurenz | 95/42 |

FOREIGN PATENTS OR APPLICATIONS

| | | | |
|---|---|---|---|
| 15,199 | 8/1908 | Great Britain | 95/42 |
| 326,688 | 3/1930 | Great Britain | 95/42 |

Primary Examiner—Joseph F. Peters, Jr.
Assistant Examiner—Michael Harris
Attorney—Brown and Mikula

[57] ABSTRACT

The specification describes a reflex camera and a viewing device particularly suited for use with it which forms an erect, unreverted viewing image of a subject to aid a user in focusing and aiming the reflex camera. One version of the viewing device employs the reflex camera's mirror to direct light from a reflective focusing screen to an approximately ellipsoid concave mirror. An eye lens magnifies a real image formed by the concave mirror. Another version of the viewing device uses a hemispherical lens, having a substantially plano mirror on its rear surface, to form a real image and a concave mirror used obliquely to magnify the image for an observer.

96 Claims, 4 Drawing Figures

INVENTOR.
JAMES G. BAKER

BY Brown and Mikulka
and
Frederick H. Brustman
ATTORNEYS

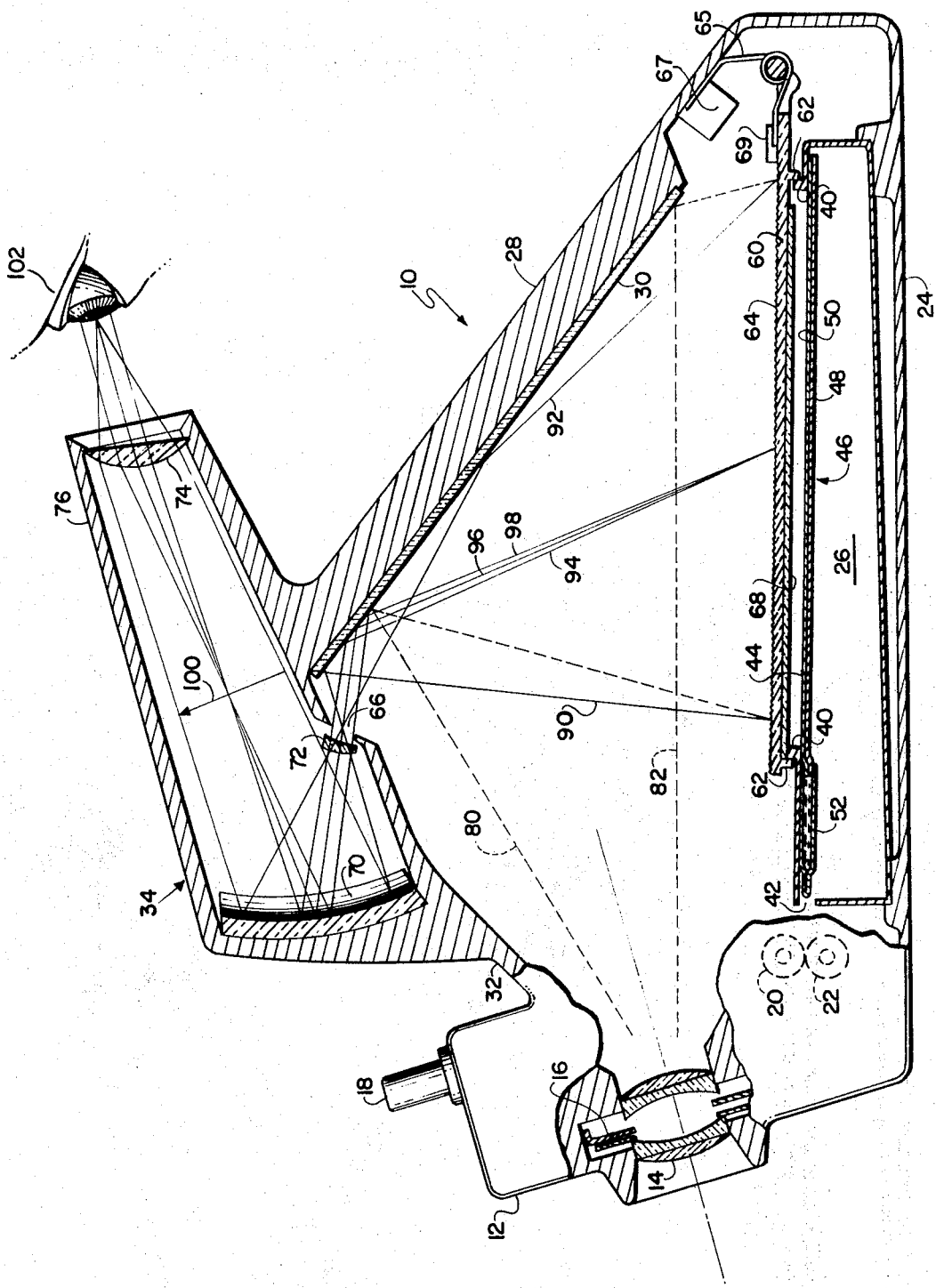

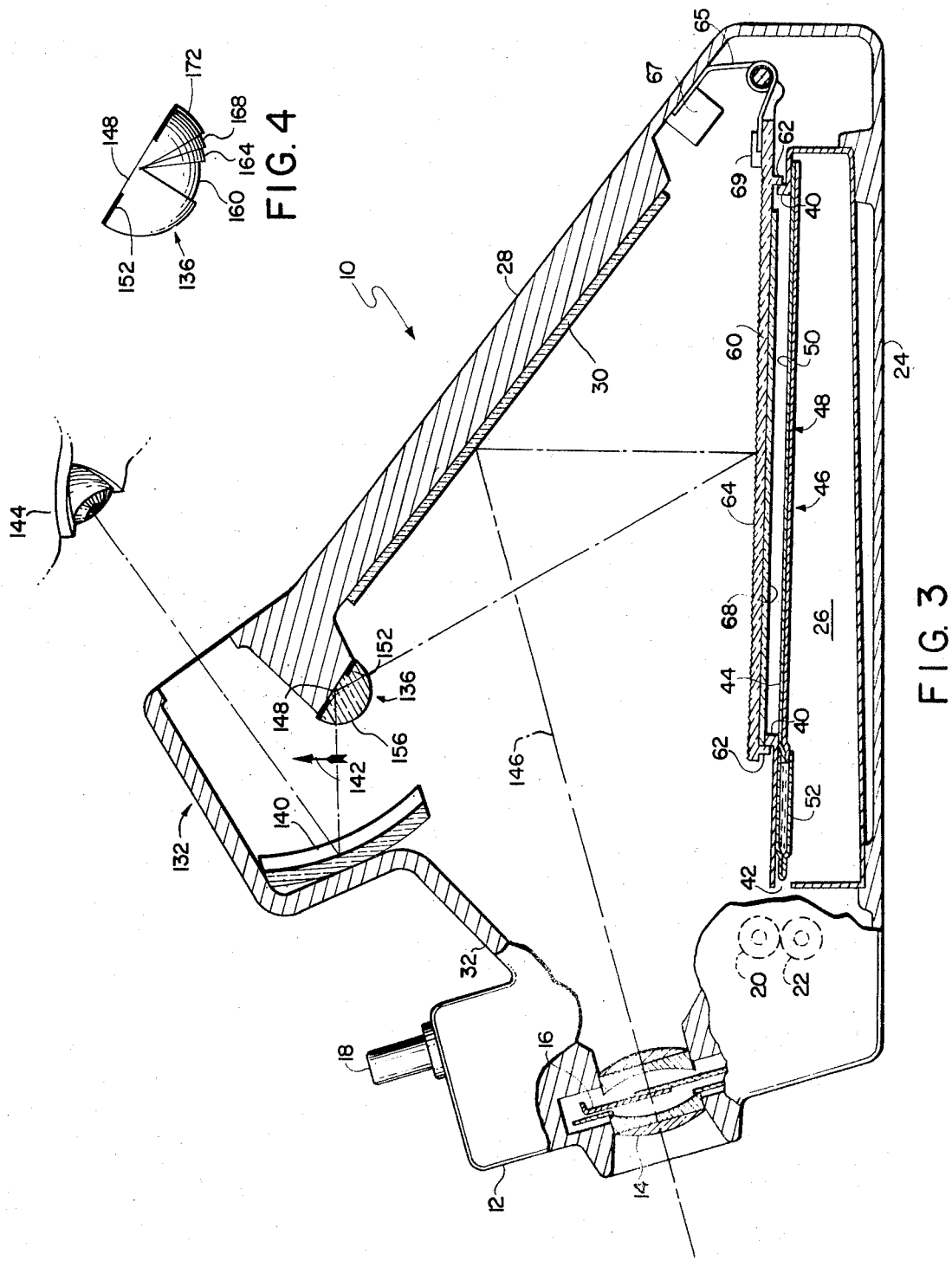

REFLEX CAMERA AND VIEWING DEVICE

This is a continuation of application Ser. No. 98,356 filed Dec. 15, 1970, now abandoned entitled "Reflex Camera and Viewing Device."

BACKGROUND OF THE INVENTION

Certain photographic materials are capable of forming a direct positive record of a subject properly imaged and exposed thereon. Exemplary of such materials are the film units described in the U.S. Patent to E. H. Land, No. 3,415,646, entitled "Novel Photographic Products and Processes." Film units of this type are intended for use with self-processing photographic cameras. They incorporate all the materials necessary to produce a positive photographic print immediately following their exposure.

While the film units are of somewhat complex chemical make up, they are physically structured to include a photosensitive sheet in laminar combination with the transparent image-receiving sheet. Specially packaged processing chemicals are also incorporated within the film units. After the film units are exposed, they are passed through the camera's processing mechanism which releases the chemicals to the photosensitive sheet.

In order to form a real unreverted image of the subject on the above-described film units, it is necessary that one or an odd number of reflex mirrors be incorporated in the optical path between the camera's objective lens and the photosensitive sheet of the film unit.

These film units generally provide a desirably large film format so the print, when removed from the camera, will be a convenient size for viewing. The reflex mirror can also be used to advantage in reducing the overall dimensions of the camera's structure despite the usefully large film format.

It has now been discovered that the reflex mirror can also be used as part of an erect, unreverted image-forming viewer in a reflex camera.

A reflex camera arrangement whereby the photographer can view the image formed by the objective lens on the focal plane has several advantages in comparison with a separate viewfinder/rangefinder. Focusing and framing by viewing an image at the focal plane of the camera permits the user to see exactly what will be recorded. It is not necessary in focusing and composing a picture to rely on the precision with which the objective lens and viewer components are assembled and calibrated. Further, the process of framing and focusing the subject in a reflex camera while viewing the actual image is simple and convenient particularly in comparison with using a separate rangefinder/viewfinder.

SUMMARY OF THE INVENTION

The present invention provides a photographic reflex camera having a viewing device through which the photographer can see the image formed by the camera's objective lens. The viewer's components are arranged to provide an erect, unreverted image. This is in marked contrast to many reflex camera viewers which form erect, but reverted, images. By erect is meant the image of the subject appears heads up. Unreverted means the right-hand side of the image corresponds to the right-hand side of the subject. Reverted indicates a reversal in the handedness between the image and the subject.

A reflex camera and viewing device according to the present invention is characterized by a housing having a forward wall, an upper portion and a lower portion. An objective lens mounted in the forward wall refracts light into an image of a subject. Reflecting means rearward of the objective lens reflects the image to an opaque reflective focusing screen positioned in the lower portion of the housing. The focusing screen reflects the image's light upward to specular mirror means which reflects the light forwardly into re-imaging means which forms an erect, unreverted image of said viewer visible from an eye station at the housing's upper portion. The re-imaging means includes at least one reflective surface arranged to intercept light from the specular mirror means and reflect it rearwardly and upwardly to the eye station.

The viewer achieves a comparatively long optical path within a compact space by the use of mirrors and other reflecting means. In addition, the noval system features an uncomplicated, but well corrected, optical arrangement requiring only a few optical components.

A feature of viewing devices according to this invention is that the user looks in substantially the same direction the camera is aimed to see the image. Therefore, he can conveniently compare the subject with its image at the exposure plane.

Other objects of the invention will in part be obvious and in part will appear hereinafter.

The invention accordingly comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings, wherein:

BRIEF DESCRIPTION OF THE DRAWINGS

FIG. 2 illustrates a partial sectional view of the reflex camera and viewing device according to the present invention showing the path of selected light rays;

FIG. 3 illustrates a partial sectional view of the reflex camera with an alternate embodiment of the viewing device; and FIG. 4 illustrates a modification of the hemispherical lens shown in the alternate embodiment shown in FIG. 3.

DETAILED DESCRIPTION OF THE INVENTION

Figure 1:
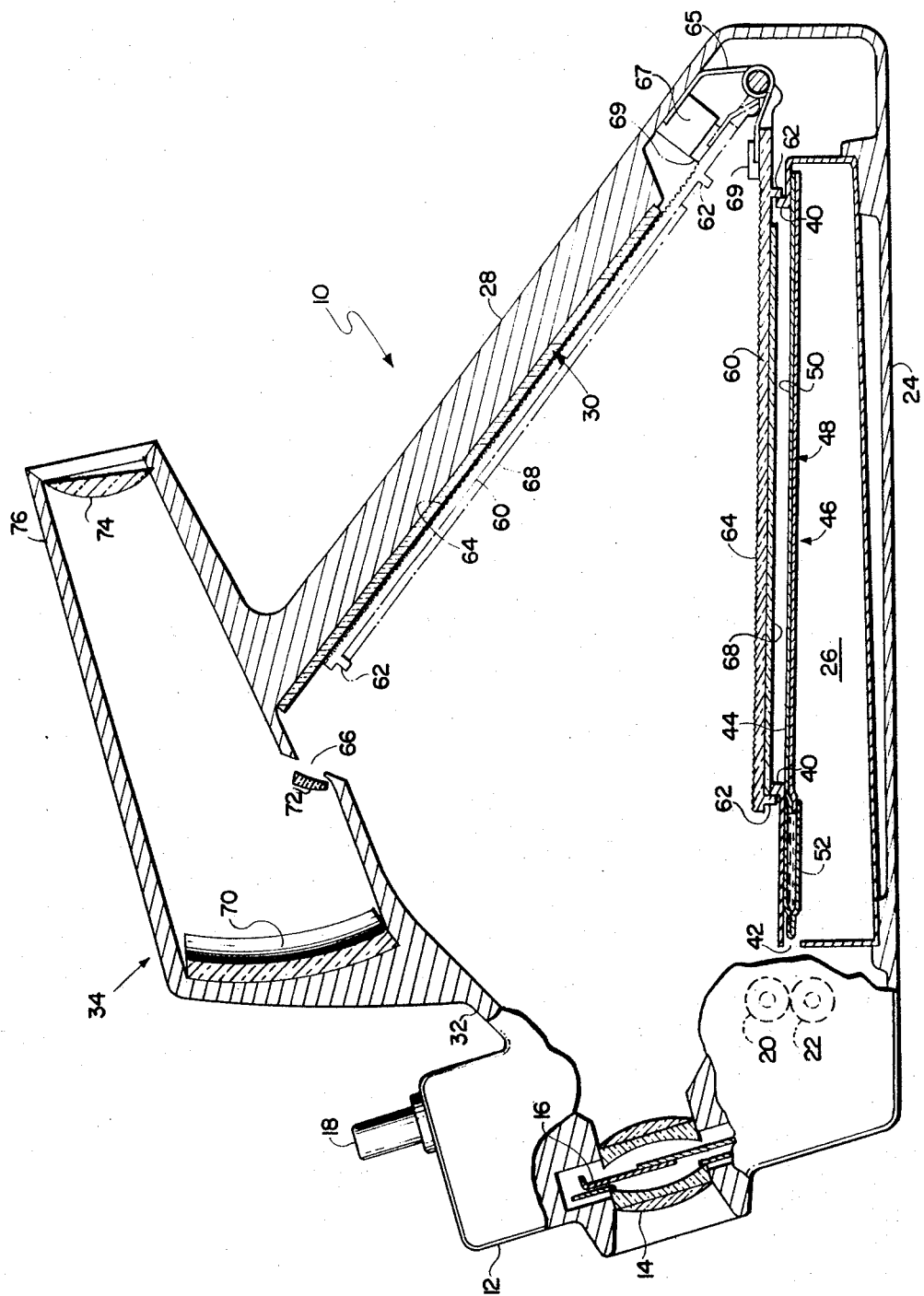
FIG. 1 illustrates a partial sectional view of a reflex camera and viewing device according to the present invention showing the orientation of certain components.

The reflex camera and viewing device according to the present invention is, at least in part, an improvement over the novel Reflex Camera disclosed in co-pending U.S. Patent application, Ser. No. 28,567, filed Apr. 15, 1970, in the name of Edwin H. Land.

Referring to FIG. 1 of the present application, the improved reflex camera and viewing device are illustrated generally at 10. The reflex camera 10 is formed having a forwardly disposed exposure control system compartment 12 within which are mounted all of the components required to regulate light passing into the camera. These components include, but are not limited to, an objective lens shown generally at 14, a shutter mechanism shown generally at 16, a shutter release button 18, electronic control circuitry (not shown), and a pair of film unit processing rolls 20 and 22. The reflex camera 10 has a bottom support portion 24 which serves as a receiving and retaining station for a film cassette. 26. The uppermost surfaces of the reflex camera 10 include a relatively elongated top wall section 28 which supports a reflex viewing mirror 30. The elongated top wall 28 is joined with a shorter forward wall portion 32, both of which serve to support the viewing device 34.

The film cassette 26, positioned within the bottom support portion 24 in the lowermost region of the reflex camera 10, is formed as a generally thin parallele-piped having a top open portion, the rectangular periphery of which is defined by an integrally formed lip 40. The forwardmost facing end of the film cassette 26 is formed incorporating an opening or slot 42 aligned with the line of tangency between the processing rolls 20 and 22. The film cassette 26 is removably insertable into the cassette receiving station within the bottom support portion 24 (by means not shown) so as to consistently and accurately orient an exposure plane 44 established at the lowermost periphery of the film frame opening defined by lip 40.

Coincidentally situated at the exposure plane 44 is the uppermost film unit 46 of the plurality of film units (not shown) contained within the film cassette 26. The film units are described in detail in the above-referenced U.S. Patent of E. H. Land. They include all of the materials necessary to produce a direct positive phorographic print. Each film unit 46 is physically structured to include a photosensitive sheet 48 positioned adjacent and in laminar relationship with a transparent sheet 50. The transparent sheet 50 is located upwardly from the photosensitive sheet 48 and is urged by spring means (not shown) into the exposure plane 44.

A rupturable container 52 of processing fluid is secured to one end of the laminar assembly of the sheets 48 and 50. The container 52 is located forwardly within the film cassette 26. Applying pressure to the container 52 causes it to rupture dispensing its processing fluid between the sheets 48 and 50. Processing is most readily accomplished in the camera 10 by advancing the film unit 46, the rupturable container 52 foremost, through the slot 42 and between the pressure-applying processing rolls 20 and 22. The pressure applied by the processing rolls 20 and 22 causes the container 52 to rupture thrreby dispensing its fluid contents between the sheets 48 and 50. Thereafter, the rolls 20 and 22 spread the fluid between and in contact with the two sheets 48 and 50.

The chemistry is now well known in the art and involves the formation of transverse substances in the exposed photosensitive sheet accompanied by their diffusion in a manner forming a visible, positive image. In the film unit 46, shown herein and described in the aforementioned U.S. Patent, the processing fluid includes an opacifying agent which is spread as a layer between the photosensitive sheet 48 and the transparent sheet 50. It is opaque to actinic light and provides a background for the photosensitive transfer image evolved in the process.

Certain components of the reflex camera 10 normally assume one position for operation in a focusing mode configuration. During the photographic recording cycle, however, these components are reoriented to assume an exposure mode configuration. In FIG. 1, the components of the reflex camera 10 are shown positioned in the focusing mode configuration. In the exposure mode configuration, a capping plate 60 rotates about an axle to the position proximate the top wall 28 where it is illustrated in broken lines.

In the focusing mode configuration, the exposure plane 44 is covered by the capping plate 60 which prevents light from striking the film unit 46. The capping plate 60 has, on its underside, ribs 62 positioned to fit over the lip 40 of the film cassette 26 in order to effect a light-tight seal. The top surface of the capping plate 60 supports an opaque reflective focusing screen 64. The focusing screen 64 is the surface upon which the objective lens 14 forms the subject's image for focusing and framing purposes. A spring 65 bears against the top of the capping plate 60 and the underside of the top wall 28 urging the capping plate 60 down over the opening in the film cassette 26.

The reflex camera 10 is converted to the recording mode configuration when capping plate 60 is rotated (by means not shown) upward to the position shown in broken lines. A magnet 67 fixed to the top wall 28 engages a keeper 69 fixed to the capping plate 60 thereby latching the capping plate 60 in the recording mode against the biasing forces of the spring 65. A cover plate (not shown) is positioned over an entrance aperture 66 to prevent light from reaching the film unit 46 through the viewer 34 when the exposure plane 44 is not covered by the capping plate 60.

Attached to the underside of the capping plate 60 is a reflex recording mirror 68. Rotating the capping plate 60 upward brings the reflex recording mirror 68 into a position adjacent the reflex viewing mirror 30. With the capping plate 60 latched in the recording mode configuration, illustrated by the broken lines, the reflex recording mirror 68 can reflect light rays, refracted by the objective lens 14, to the film unit 46 since the exposure plane 44 is no longer covered.

In the focusing mode configuration, light rays are refracted by the objective lens 14 and reflected by reflex viewing mirror 30 toward the opaque reflective focusing screen 64. The objective lens 14 is adjusted to focus a real image of the subject on the focusing screen 64. At least some of the light forming the real image is reflected or scattered upward from the focusing screen 64 and forward by the reflex viewing mirror 30, entering the viewing device 34 through its entrance aperture 66. It is reflected rearwardly by a concave mirror 70 which forms the light into an erect, unreverted image of the subject. The sharpness of the image seen in the viewing device 34 is a direct indication of the sharpness the photographic image will have. Therefore, it can be used to focus the objective 14.

The focusing screen 64 is preferebly somewhat smaller than, but with the same shape as, the film format at the exposure plane 44. If focusing screen 64 has the same shape as the film format, it aids in framing the subject. Having the focusing screen 64 slightly smaller than the film format reduces the chances for accidentally cutting off a portion of the subject by a minor framing error.

Light rays emanating from the image formed on the reflective focusing screen 64 are reflected by the reflex viewing mirror 30 through the entrance aperture 66 and, in one form of the invention, through a prismatic refractor 72 onto the concave mirror 70 in the viewing device 34. The concave mirror 70 forms a real, erect, unreverted image of the subject. An eye lens 74 magnifies the image for a person looking into it, but does not affect it erect, unreverted nature. The magnified image is virtual. A casing 76 supports and protects the viewing device 34's optical components. The casing 76 also excludes ambient light from the viewing device 34 so the image is not hidden by glare.

A useful operating sequence for use with the reflex camera 10 of the present invention begins with the focusing mode wherein the capping plate 60 seals the opening in the film cassette 26 to prevent exposure of the film units 46 therein. In the focusing mode, the shutter 16 is in the open position permitting the objective lens 14 to form an image at the reflective focusing screen 64. After focusing the reflex camera 10, the operator simply presses the shutter release button 18 to initiate the following sequence of steps: the shutter 16 closes and the cover plate blocks the entrance aperture 66. Next, the capping plate 60 rotates upwardly uncovering the uppermost film unit 46 and bringing the reflex recording mirror 68 into position; thereafter, the shutter 16 automatically exposes the film unit 46; and, after the shutter 16 closes, the capping plate 60 rotates downward sealing the film cassette 26 again and the other components then return to their focusing mode positions as aforesaid.

The magnetic latching arrangement 67, 69 and the thickness of both the capping plate 60 and the recording reflex mirror 68 are selected so that the optical path distance between the objective lens 14 and focusing screen 64, via the viewing reflex mirror 30, is exactly the same as the optical path distance between the objective lens 14 and the exposure plane 44, via the recording reflex mirror 68. With that relationship assured, any image which is seen to be sharply focused on the focusing screen 64 will also be sharply focused at the exposure plane 44 when the capping plate 60, with the recording reflex mirror 68, rotates upward to convert the camera into the recording mode configuration.

Reference should be had to FIG. 2 for a better understanding of how the viewing device 34 functions in relation to the reflex camera 10.

In the viewing mode configuration, illustrated in FIG. 2, light is admitted into the reflex camera 10 through the open shutter 16. The entering light is exemplified by a pair of rays 80 and 82 which represent the chief rays from the top and bottom edges of the reflex camera 10's field of view. The viewing reflex mirror 30 reflects the rays 80 and 82 toward the focusing screen 64. One adjusts the objective lens 14, thereby sharply focusing the entering light rays, including the rays 80 and 82, into a real image on the focusing screen 64's surface.

In order to provide a full-field, erect and unreverted image, it is necessary that some light from every point of the focusing screen 64 reaches the concave mirror 70 through the viewer 34's aperture 66. A white matte texture, applied to the flat surface of the focusing screen 64, will diffusely reflect light incident thereon. Diffuse reflection from the focusing screen 64 scatters light from each point within the image formed thereon light in all directions, assuring that at least some light will be reflected from the viewing reflex mirror 30 into the viewing device 34 through the entrance aperture 66.

The white matte texture also aids the user in focusing the real image precisely on the surface of the focusing screen 64. Light radiates (diffusely reflects) from the matte surface of focusing screen 64 as from an independent source. One need only decide whether or not that source is a sharply focused image. Specular reflection from focusing screen 64 would merely change the direction of the light rays. With specular reflection, the user would have to decide where the aerial image lies instead of deciding if it is in focus. The latter decision cannot be made with sufficient accuracy for photography; therefore, it is expedient to use a matte texture to prevent the coherent reflection of light from focusing screen 64.

A matte texture on the surface of the reflective focusing screen 64 results in only a small fraction of the available light actually entering the viewer 34. An echelon mirror, substituted for the matte texture, will direct more light into the viewer 34 by imaging the exit pupil of the objective lens 14 at the entrance aperture 66. Another configuration substituted for the matte texture which will also direct more light into the viewer 34 is described in a copending application for United States Patent entitled "Reflective Imaging Apparatus" by N. Gold, Ser. No. 83,030, filed Oct. 22, 1970 and assigned to Polaroid Corporation, now U.S. Pat. No. 3,690,240.

The objective lens 14 and the viewing reflex mirror 30 form a sharply focused real, unreverted image on the focusing screen 64. A plurality of light rays 90 92, 94, 96, and 98 represent light rays emanating from the focusing screen 64 which viewing reflex mirror 30 reflects through the entrance aperaute 66 onto the concave mirror 70.

The light rays 90, 92, and 96 are chief rays; a chief ray being one which passes through the center of the entrance pupil. Preferably, the entrance aperture 66 is located to serve as the entrance pupil for the concave mirror 70. The rays 90 and 92 define the top and bottom edges of the image field. For convenience, chief ray 96 emanating from the center of focus screen 64 is chosen to define the optic axis of viewing device 34 from the entrance aperture 66 of the eye lens 74.

Rays 94 and 98, as well as the chief ray 96, represent a pencil of light rays emanating upwardly from the center of the image formed on the focusing screen 64. They are reflected forwardly by the reflex viewing mirror 30 to the entrance aperture 66. The size of entrance aperture 66 establishes the angular extent of that pencil. The concave mirror 70 rearwardly reflects the rays 94, 96, and 98 causing them to converge at a point in the surface symbolized by an erect arrow 100. That surface is the conjugate surface of the substantially plano focusing screen 64, relative to the cocave mirror 70.

The image-forming mirror 70 forms a real image of the focusing screen 64 at its conjugate surface, where the arrow 100 is shown. The arrow 100 represents an aerial image of both the focusing screen 64 and whatever image the objective lens 14 formed on the focusing screen 64. Thus, the arow 100 represents a real, erect, unreverted image of the reflex camera 10's subject.

The eye lens 74 receives and refracts light rays forming the image represented by the arrow 100. It magnifies the image for the user, represented by an eye, who views from an eye station 102.

The concave mirror 70 is mounted at an angle to the optic axis in order to reflect the image over the ridge formed by the top wall 28 and the forward wall 32 at the top of the reflex camera 10. This orientation results in substantially different optical paths for light rays emanating from forward and rearward portions of the focusing screen 64. Consequently, the concave mirror 70 magnifies the forward and rearward portions of the image differently, if it has a spherical shape. A disconnecting keystone-shape image results. Other serious aberrations and distortions are also present.

The most desirable shape for the concave mirror 70 is one which minimizes the keystone-shape and reflects the light emanating from the focusing screen 64 into a sharp aerial image surface. As explained below, these ends are attained by using an approximately ellipsoid shape for the reflecting surface of the image-forming mirror 70, and a tilted entrance aperture or stop at or near one focus of the approximate ellipsoid as explained below. Tilting and decentering the eye lens 74, with respect to the viewing device 34's optic axis, achieves further improvement in the image. Aspheric curvatures on one or both surfaces of the eye lens 74 can also improve the image.

An ellipsoidal mirror will form sharply focused images of a point located at either focus of the ellipsoid. If a stop is placed at either focus of an ellipsoidal mirror, any object surface (such as the focusing screen 64) located beyond the focus will be imaged into a stigmatic aerial image surface after reflection. The foci are the locations of the stop, the entrance aperture 66, and the exit pupil whether the latter is real or virtual due to eye lens 74.

Tilting the entrance aperture 66, with respect to the viewing device 34's optic axis, represented by the chief ray 96, compensates in part for the varying pupil size caused by the differential magnification of the image as produced by preferred shapes for mirror 70 and eye lens 74. Presuming that the aperture 66 is circular, tilting it, as shown, effectively enlarges it at the top where it would be too small and foreshortens it at the bottom where it would be too large. 15° to 25° is a useful range in which to tilt entrance aperture 66 if it has a circular shape. In addition, as asymmetric aperture can be used.

Locating the aperture at the approximate ellipsoid mirror's focus eliminates dark spots in the image due to vignetting. Good image acuity is also promoted thereby.

The eye lens 74 helps to correct aberrations in the real image formed by the concave mirror 70. The surfaces of the eye lens 74 are tilted relative to the viewing device 34's optic axis, represented by the chief ray 96, and are slightly decentered. Tilting the surfaces of the eye lens 74 is a prime aid in correcting image distortion. Both surfaces are tilted backward (clockwise) and the stronger curvature is slightly displaced downward from the optic axis. The actual image viewed from the eye station 102 is the result of the corrections jointly effected by the shape of the concave mirror 70 and that of the eye lens 74.

The prismatic refractor 72 proximate the entrance aperture 66 can further improve the quality of the image to be seen through the viewing device 34. Its use is optional. The prismatic refractor 72 can reduce chromatic aberrations due to the eye lens 74, particularly if the latter incorporates prismatic power to effect additional downward direction of the optic axis to the eye station 102. A compound (two element) prismatic refractor is even more effective for that purpose. Coma and spherical aberration caused by the mirror 70 and eye lens 74 combination can be reduced by the proper toroidal and aspheric shapes on the surfaces of the refractor 72. Tilting and displacing the refractor 72's surfaces can also help to reduce the aberrations affecting the image seen through the viewing device 34.

A substantial portion of the viewing device 34's imaging power can be incorporated into the prismatic refractor 72 rather than in the concave mirror 70. It is also possible to place all the imaging power into the refractor 72. If refractor 72 has all the imaging power, a flat mirror, substituted for concave mirror 70, reflects the light to the eye lens 74. While the latter configuration is possible, the necessary refracting elements are quite small and difficult to manufacture and assemble. Therefore, the preferred optical configuration has the imaging power in the concave mirror 70. The refractor 72, if it is used, augments the other means fo correcting aberrations.

The objective lens 14 forms an upside down, reverted image of the subject. After reflection of the image by the viewing reflex mirror 30 to the focusing screen 64 the image is still upside down and reverted for one looking directly at the focusing screen 64. The image seen by the concave mirror 70 is upside down and unreverted after the re-reflection from the viewing reflex mirror 30. Reversion and inversion result from the action of the concave mirror 70 just as they did from the objective lens 14's action. Therefore, the image of the subject seen in the viewing device 34, represented by the arrow 100, is erect and unreverted as seen from the eye station 102. The eye lens 74 is a magnifier and, therefore, does not change the erect, unreverted nature of the image.

The reflex camera 10 illustrated in FIG. 3 incorporates an alternate embodiment of the viewing device 132. Light reflected obliquely from the image formed on the focusing screen 64 reaches a hemispherical lens 136 positioned so it will not obscure the viewing reflex mirror 30. The hemispherical lens 136 forms an aerial image 142 of the subject between itself and a concave mirror 140 using light reflected from the focusing screen 64. The concave mirror 140 magnifies the aerial image and directs it to an eye station 144. Looking from the eye station 144, into the viewing device 132, one can see an erect, unreverted image of the subject. A chief ray 146 illustrates the general direction of light entering the reflex camera 10 which reaches the eye station 144.

The hemishperical lens 136 has an aluminized spot 148 on its substantially planar surface 152 to reflect light refracted through a first portion of its hemishperical surface 156 to a second portion thereof. The aluminized spot 148 determined the entrance pupil for the optics. Light-absorbent paint or other means on the portion of the surface 152 surrounding the aluminized spot 148 prevents specular reflection therefrom. An approximately ellipsoid reflecting surface on the concave mirror 140 minimizes the distortion of the magnified image viewed from the eye station 144. Optimally tilting surface 152 with respect to the axis of the viewing device 132 will also reduce the distortion.

FIG. 4 illustrates a generally hemispherical modification of the hemispherical lens 136 having a plurality of lunate zones 160, 164, 168, and 172. The lunate zones 160, 164, 168, and 172, positioned toward the focusing screen 64, minimize differential focus in the aerial image due to the hemispherical lens 136's oblique position relative to the tilted mirror 140 and to the focusing screen 64. The lunate zone associated with the furthest portion of the focusing screen 64 has the longest radius of curvature.

In a variation of viewing device 132 (not illustrated), a fully spherical lens without an internal mirror is used in a place of the hemispherical lens. The spherical lens contains a central stop of predetermined shape and tilt with respect to the viewing device's axis. The reflex viewing mirror 30 reflects light from the focusing screen 60 into the spherical lens. The eye relief at eye station 144 is then quite large and is very convenient for wearers of spectacles.

The spacing and form of the optical elements are particularly suitable for incorporation within a folding casing. Thus, one embodiment of the present invention is a viewing device which can be folded into a very compact space.

Since certain changes may be made in the present reflex camera and viewing device without departing from the scope of the invention herein involved, it is intended that all matter contained in the above description or shown in the accompanying drawings shall be intepreted as illustrative and not in a limiting sense.

I claim:

1. A reflex camera and viewing device, including:
   a housing having a forward wall, a lower portion, and an upper portion;
   an objective lens in said forward wall for forming an image of a subject;
   an opaque reflective focusing screen positionable in said lower portion;
   an eye station being located at said upper portion;
   reflecting means, rearward of said forward wall, for reflecting a real image of a subject formed by said objective lens to said opaque reflective focusing screen;
   specular mirror means for reflecting, in a substantially forward direction, light emanating upward from said real image at said opaque focusing screen; and
   re-imaging means, including at least one reflective surface arranged to intercept light from said specular mirror means and to reflect said light rearwardly to said eye station, for forming an erect, unreverted image of said subject from said light.

2. The reflex camera and viewing device described in claim 1, wherein said re-imaging means comprises a concave mirror with a shape approximating a portion of an ellipsoidal surface.

3. The reflex camera and viewing device described in claim 2, wherein said ellipsoidal surface has two foci, one of said foci being closer to said focusing screen that the other, further comprising:
   means for establishing an entrance pupil for said viewing device at the focus of said ellipsoid-shape concave mirror, nearest said opaque focusing screen; and
   eye lens means for magnifying said erect unreverted image.

4. The reflex camera and viewing device described in claim 3 wherein said entrance pupil is tilted with respect to said viewing device's optic axis and said eye lens means is tilted and decentered with respect to said viewing device's optic axis.

5. The reflex camera and viewing device described in claim 1 wherein said reflecting means and said specular mirror means comprise overlapping areas of the same mirror.

6. The reflex camera and viewing device described in claim 3 further comprising means, at said opaque focusing screen, for forming an image of said objective len's exit pupil at the entrance pupil of said viewing device.

7. A camera with a viewing device, comprising:
   objective lens means for forming a real image of a subject at the exposure plane of said camera;
   means for reflecting light forming said real image from said objective lens means toward said exposure plane;
   focusing screen means, proximate said film plane, for reflecting said light forming said real image;
   mirror means for effecting even ordered reflection of light emanating from said focusing screen means; and
   means for forming an image, from said light emanating from said focusing screen means, operatively associated with said mirror means to provide an erect and unreverted image of said subject.

8. The camera with a viewing device described in claim 7 further comprising a casing, containing said means for forming an image, having an aperture to permit said light to reach said means for forming an image.

9. The camera with a viewing device described in claim 8 wherein said means for forming an image includes means proximate said aperture for refracting said light.

10. The camera with a viewing device described in claim 8 wherein said means for forming an image includes a curved image-forming mirror.

11. The camera with a viewing device described in claim 10 wherein said curved image-forming mirror comprises a concave reflecting surface.

12. The camera with a viewing device described in claim 11 wherein said concave surface of said image-forming mirror has an aspheric shape.

13. The camera wth a viewing device described in claim 11 wherein the shape of said concave surface of said image-forming mirror approximates that of an ellipsoidal segment.

14. The camera with a viewing device described in claim 13 wherein said aperture is located proximate a focus of said ellipsoidal segment and said viewing device has an optic axis passing through said aperture.

15. The camera with a viewing device described in claim 14 wherein said aperture is tilted with respect to said viewing device's optic axis.

16. The camera with a viewing device described in claim 10 further comprising refractive means for magnifying said erect and unreverted image.

17. The camera with a viewing device described in claim 16 wherein said refractive means comprises an eye lens tilted with respect to said viewing device's optic axis.

18. The camera with a viewing device described in claim 17 wherein at least one of said eye lens' surfaces is aspheric.

19. The camera with a viewing device described in claim 16 wherein said refractive means comprises an eye lens with two surfaces, each with its center displaced from said viewing device's optic axis.

20. The camera with a viewing device described in claim 16 further comprising means for reducing the chromatic aberrations occurring in said viewing device.

21. The camera with a viewing device described in claim 7 wherein said means for reflecting light and said mirror means comprise overlapping areas of the same mirror.

22. The camera with a viewing device described in claim 8 wherein said focusing screen means comprises a generally planar configured reflecting surface, acting to form a diffuse image of said objective lens' aperture filling said aperture in said casing via reflection from said means for reflecting light.

23. The camera with a viewing device described in claim 22 wherein said configured reflecting surface comprises an echelon mirror.

24. A viewing device, comprising:
mirror means for reflecting a real image of a subject to a focal plane;
image-forming means, positioned to receive light emanating from said real image on said focal plane, via reflection from said mirror means, for providing an erect and unreverted image of said subject at a viewing station.

25. The viewing device described in claim 24 wherein said image-forming means comprises an image-forming mirror.

26. The viewing device described in claim 25 further comprising a casing containing said image-forming mirror, said casing having an aperture to permit light reflected by said mirror means, from said focal plane, to reach said image-forming mirror.

27. The viewing device described in claim 26 wherein said image-forming means further comprises means proximate said aperture for refracting light forming said erect, unreverted image.

28. The viewing device described in claim 26 wherein said image-forming mirror comprises a concave reflecting surface.

29. The viewing device described in claim 28 wherein said concave surface of said image-forming mirror has an aspheric shape.

30. The viewing device described in claim 29 wherein said concave surface of said image-forming mirror approximates an ellipsoidal segment in shape.

31. The viewing device described in claim 30 wherein said aperture is located proximate a focus of said ellipsoidal segment.

32. The viewing device described in claim 26 wherein said aperture is tilted with respect to said viewing device's optic axis.

33. The viewing device described in claim 28 further comprising refractive means positioned for magnifying said erect and unreverted image for an observer.

34. The viewing device described in claim 33 wherein said refractive means comprises an eye lens tilted with respect to said viewing device's optic axis.

35. The viewing device described in claim 34 wherein at least one of said eye lens' surfaces is aspheric.

36. The viewing device described in claim 33 wherein said refractive means comprises an eye lens with two surfaces, each with its center displaced from said viewing device's optic axis.

37. The viewing device described in claim 33 further comprising means for reducing the chromatic aberrations occurring in said viewing device.

38. A viewing device, comprising:
a housing;
an image-forming mirror, inside said housing, having a concave reflecting surface with an ellipsoidal shape, said mirror positioned so one focus of said ellipsoidal shape is nearer to the scene to be viewed than the other focus; and
an aperture in said housing proximate the focus of said ellipsoidal shape nearest the scene to be viewed, said mirror forming an image of said scene.

39. The viewing device described in claim 38 further comprising refractive means positioned for magnifying said image.

40. The viewing device described in claim 39 wherein said refractive means comprises an eye lens tilted with respect to said viewing device's optic axis.

41. The viewing device described in claim 39 wherein said refractive means comprises an eye lens with two surfaces and each surface of said eye lens is displaced from said viewing device's optic axis.

42. The viewing device described in claim 39 further comprising means for reducing the chromatic aberrations occurring in said viewing device.

43. The viewing device described in claim 42 wherein said means for reducing chromatic aberrations is proximate said aperture.

44. The viewing device described in claim 38 further comprising mirror means positioned for reflecting a real image of a subject onto a focal plane and to reflect light emanating from said focal plane toward said aperture.

45. A camera with a viewing device, comprising:
objective lens means for forming a real image of a subject at the exposure plane of said camera;
a mirror, positioned behind said objective lens means, so at least a first portion of said mirror reflects light forming said real image from said objective lens means toward said exposure plane;
an echelon mirror having a slightly diffusing reflecting surface proximate said exposure plane for reflecting said light forming said real image to a second portion of said mirror, said first and second portions overlapping each other;
a concave mirror whose reflecting surface approximates an ellipsoidal segment in shape, positioned to receive said light after its reflection from said second portion of said mirror, for forming an erect and unreverted image of said subject;
a casing containing said ellipsoidal mirror, said casing having an aperture therein located proximate a focus of said ellipsoidal mirror; and
an eye lens positioned to magnify said erect and unreverted image of said subject for an observer, the surface axes of said eye lens being canted relative to the optic axis of said viewing device.

46. In combination with a photographic camera having: means for supporting a photosensitive material at an exposure plane; objective lens means for focusing the image of a subject at a focal plane; means for establishing an optical path from said lens means to said focal plane, said optical path including specular reflecting surface means for establishing said focal plane at said exposure plane when in an exposure mode and for establishing said focal plane at a viewing surface near said exposure plane when in a focusing mode; and means for effecting the exposure of said photosensitive material when said optical path means is in said exposure mode; wherein the improvement comprises, image-forming means, operatively associated with said specular reflecting surface means, for providing an erect and unreverted image of said subject from said subject's image when said subject's image is focused at said viewing surface.

47. The improved camera described in claim 46 further comprising a casing, containing said image-forming means, having an aperture to permit light from said viewing surface to reach said image-forming means.

48. The improved camera described in claim 47 wherein said image-forming means includes proximate said aperture for refracting said light.

49. The improved camera described in claim 47 wherein said image-forming means includes a concave mirror.

50. The improved camera described in claim 49 wherein the surface of said concave mirror has an aspheric shape.

51. The improved camera described in claim 49 wherein the shape of said concave mirror approximates that of an ellipsoidal segment.

52. The improved camera described in claim 51 wherein said aperture is located proximate a focus of said ellipsoidal segment.

53. The improved camera described in claim 52 wherein the plane of said aperture is tilted with respect to the direction of said light.

54. The improved camera described in claim 49 wherein the improvement further comprises refractive means for magnifying said erect and unreverted image.

55. The improved camera described in claim 54 wherein said refractive means comprises an eye lens tilted with respect to the path of light from said concave mirror that forms said erect and unreverted image.

56. The improved camera described in claim 55 wherein at least one of said eye lens' surfaces is aspheric.

57. The improved camera described in claim 54 wherein the improvement further comprises means for reducing the chromatic aberrations of said erect and unreverted image.

58. A reflex camera with a viewing device for observing the image of a subject formed by said reflex camera's objective lens at said reflex camera's focal plane, said viewing device comprising:
a lens having a generally hemispherical refracting surface and a planar surface with means for reflecting light inside said lens between first and second portions of said hemispherical surface, said lens forming an aerial image of said subject; and
concave mirror means, spaced from said lens, for magnifying said aerial image.

59. The reflex camera with a viewing device described in claim 58 wherein said lens is positioned so the path of light to said lens from said focal plane is oblique to said focal plane.

60. The reflex camera with a viewing device described in claim 58 wherein said concave mirror means has a spherical reflecting surface.

61. The reflex camera with a viewing device described in claim 58 wherein said concave mirror means has an ellipsoidal reflecting surface to minimize distortion in the magnified image.

62. The reflex camera with a viewing device described in claim 58 wherein said planar surface's means for reflecting light is a metalized spot, said metalized spot's area determining the size of said viewing device's entrance pupil, and the portion of said planar surface surrounding said mirror treated to prevent specular reflection therefrom.

63. The reflex camera with a viewing device described in claim 62 further comprising means for absorbing light incident on said planar surface surrounding said mirror.

64. The reflex camera with a viewing device described in claim 59 further comprising intrinsic means for minimizing differential focus of said subject's image due to said lens' oblique position relative to said focal plane.

65. The reflex camera with a viewing device described in claim 64 wherein said intrinsic means comprises a plurality of lunate zones that form said first portion of said hemispherical surface, each said lunate zone having a predetermined radius of surface curvature and acting in association with a specified zone of said focal plane to form an image thereof.

66. In combination with a photographic camera of the type having means for supporting a photosensitive material at an exposure plane; objective lens means for focusing the image of a subject at a focal plane; means for establishing an optical path from said objective lens means to said focal plane, including mirror means; means for protecting said photosensitive material from light and means for effecting the exposure of said photosensitive material; the improvement which comprises:
concave approximately ellipsoid mirror means, operatively associated with said mirror means, for forming an erect and unreverted image of said subject;
a housing to protect said concave approximately ellipsoid mirror means, said housing having a window opposite said concave approximately ellipsoid mirror means and an aperture located between said concave approximately ellipsoid mirror means and said mirror means at a focus of said concave aproximately ellipsoid mirror means; and
eye lens means, positioned at said window, for magnifying said erect and unreverted image of said subject.

67. A viewing device, comprising:
mirror means for reflecting a real image of a subject to a focal plane; and
image-forming means, positioned to receive light emanating from said real image on said focal plane, via another reflection from said mirror means, for providing an image of said subject at a viewing station; whereby said mirror means is used twice.

68. The viewing device described in claim 67 wherein said image-forming means comprises an image-forming mirror.

69. The viewing device described in claim 67 further comprising a casing containing at least a portion of said image-forming means, said casing having an aperture to permit light reflected by said mirror means, from said focal plane, to enter said viewing device.

70. The viewing device described in claim 69 wherein said image-forming means includes means proximate said aperture for refracting light.

71. The viewing device described in claim 68 wherein said image-forming mirror comprises a concave reflecting surface.

72. The viewing device described in claim 71 wherein said concave surface of said image-forming mirror has an aspheric shape.

73. The viewing device described in claim 72 wherein said concave surface of said image-forming mirror approximates the shape of a segment of an ellipsoid.

74. The viewing device described in claim 73 further comprising:
a casing containing said image-forming mirror; and
an aperture in said casing proximate a focus of said ellipsoid, said focus being located along the optical path of said viewfinder between said image-forming mirror and said focal plane.

75. The viewing device described in claim 74 wherein said aperture is tilted with respect to said viewing device's optic axis.

76. The viewing device described in claim 71 further comprising refractive means positioned for magnifying said image for an observer.

77. The viewing device described in claim 76 wherein said refractive means comprises an eye lens tilted with respect to said viewing device's optic axis.

78. The viewing device described in claim 77 wherein at least one of said eye lens' surfaces is aspheric.

79. The viewing device described in claim 77 wherein said refractive means comprises an eye lens with two surfaces, each with its center displaced from said viewing device's optic axis.

80. The viewing device described in claim 76 further comprising means, proximate said aperture, for reducing the chromatic aberrations occurring in said viewing device.

81. A reflex camera and viewing device, including:
a housing having a forward wall, a lower portion, and an upper portion;
an objective lens in said forward wall for forming an image of a subject;
an opaque, reflective focusing screen positionable in said lower portion;
an eye station being located at said upper portion;
reflecting means, rearward of said forward wall, for reflecting a real image of a subject formed by said objective lens downward to said opaque, reflective focusing screen, said opaque, reflective focusing screen reflecting the light incident thereon, that forms said real image, upward to specular mirror means;
specular mirror means, opposite said focusing screen, for reflecting, in a forward direction, said light emanating upward from said opaque, reflective focusing screen; and
re-imaging means, including at least one reflective surface arranged to intercept light from said specular mirror means and to reflect said light rearwardly to said eye station, for forming an image of said subject from said light.

82. The reflective camera and viewing device described in claim 81 wherein said re-imaging means comprises a concave mirror with a shape that approximates a section of an ellipsoid.

83. The reflex camera and viewing device described in claim 82 wherein said concave mirror is positioned so one focus of said ellipsoid is closer to said focusing screen that the other focus of said ellipsoid, further comprising:
means for establishing an entrance pupil for said viewing device proximate said focus of said ellipsoidal concave mirror closer to said focusing screen; and
eye lens means for magnifying said image.

84. The reflex camera and viewing device described in claim 83 wherein said entrance pupil is tilted with respect to said viewing device's optic axis and said eye lens means is tilted with respect to said viewing device's optic axis.

85. The reflex camera and viewing device described in claim 81 wherein said reflecting means and said specular mirror means comprise overlapping areas of the same mirror.

86. The reflex camera and viewing device described in claim 81 further comprising means, at said focusing screen, for forming an image of said objective lens' exit pupil at the entrance pupil of said viewing device.

87. A photographic camera of the type having means defining an optical path through said camera from an objective lens to an eye station, a focusing screen covering the film plane of said camera, and mirror means having a first portion for reflecting a real image of a subject formed by said objective lens toward said focusing screen, said camera including:
viewing means for inspecting said real image at said focusing screen via a reflection from a second portion of said mirror means partially overlapping said first portion; said optical path coursing from said objective lens to said focusing screen, via reflection from said first portion of said mirror means, and then coursing from said focusing screen to said viewing means, via reflection from said second portion of said mirror means, finally coursing from said viewing means to said eye station.

88. The photographic camera described in claim 87 further comprising means for movably connecting said focusing screen within said camera so as to be displaceable from said film plane to permit a photographic exposure.

89. The photographic camera described in claim 87 wherein the optical path length from one portion of the focusing screen to the viewing means is longer than the optical path length from another portion of the focusing screen to the viewing means, said viewing means further including means for correcting for keystoning of the image inspected at the eye station otherwise resulting from said unequal optical path lengths.

90. The photographic camera described in claim 89 wherein said means to correct for keystoning comprises a concave mirror having a generally ellipsoidal reflecting surface.

91. The photographic camera described in claim 87 wherein said viewing means further includes an eye lens for magnifying said image inspected from said eye station and said eye station lens is tilted and decentered with respect to the optical axis of said viewing means to further improve said image inspected from said eye station.

92. The photographic camera described in claim 91 wherein said eye lens has at least one aspheric surface that further improves the image seen from said eye station.

93. A viewing device for use with a reflex camera having an objective lens for refracting light into a real image of a subject, a reflective focusing screen, and a plane mirror for reflecting said real image to said reflective focusing screen by a first reflection of said light, said viewing device comprising:
a concave mirror for forming an aerial image of said reflective focusing screen and said reel image formed thereon using light emanating from said reflective focusing screen, said concave mirror being positioned to receive said light from said reflective focusing screen via a second reflection of said light from said plane mirror;

an aperture located between said concave mirror and said plane mirror to allow said light to reach said concave mirror from said focusing screen via said second reflection from said plane mirror, wherein the optical path from said focusing screen through said aperture to said concave mirror, via said second reflection from said plane mirror, is oblique to said focusing screen, and said concave mirror has a configuration, to compensate for a keystone shape of the image otherwise seen from an eye station due to the obliqueness of the optical path to the focusing screen, that approximates a section of an ellipsoid with two foci, and said concave mirror is positioned so one of said foci is disposed at said aperture and the other of said foci is disposed at said eye station;

an eye lens, positioned to receive said light after its reflection from said concave mirror, for magnifying said aerial image as seen from said eye station, said eye lens having at least one asymmetric refracting surface and being tilted and decentered, with respect to the optical path from said concave mirror to said eye station, so as to improve the quality of the magnified image viewable from said eye station; and an asymmetric refracting element, proximate said aperture, for further improving the quality of the magnified image viewable at said eye station.

94. A viewing device, comprising:

a housing a lens proximate an entrance to said housing having at least one operative spherical refracting surface, said lens forming an aerial image of a subject;

an aperture stop in a plane containing the center of said refracting surface's sphere; and mirror means, inside said housing and spaced apart from said lens, for redirecting the light forming said aerial image to an eye station outside said housing.

95. A reflex camera with a viewing device for observing the image of a subject formed by said reflex camera's objective lens at said reflex camera's focal plane, said viewing device comprising:

a lens having at least one operative spherical refracting surface, said lens forming an aerial image of said subject;

an aperture stop proximate the center of said refracting surface's sphere; and mirror means, spaced apart from said lens, for redirecting the light forming said aerial image to an eye station.

96. A viewing device, comprising:

mirror means having a first portion for reflecting a real image of a subject toward a focal plane; and means for inspecting said real image at said focal plane via a reflection from a second portion of said mirror means, said second portion at least partially overlapping said first portion.

* * * * *